United States Patent [19]

Kraus

[11] Patent Number: 4,477,870

[45] Date of Patent: Oct. 16, 1984

[54] DIGITAL CONTROL SYSTEM MONITOR HAVING A PREDETERMINED OUTPUT UNDER FAULT CONDITIONS

[75] Inventor: Mark G. Kraus, Churchill Borough, Pa.

[73] Assignee: Westinghouse Electric Corp., Pittsburgh, Pa.

[21] Appl. No.: 382,436

[22] Filed: May 26, 1982

[51] Int. Cl.³ .......... G06F 11/00

[52] U.S. Cl. .......... 364/186; 371/25; 371/62; 371/68

[58] Field of Search .......... 364/184, 185, 186; 371/25, 62, 68

[56] References Cited

U.S. PATENT DOCUMENTS

| | | | |
|---|---|---|---|
| 3,521,172 | 7/1970 | Harmon | 371/62 X |
| 4,107,253 | 8/1978 | Borg et al. | 364/426 X |
| 4,122,995 | 10/1978 | Franke | 371/25 X |
| 4,255,809 | 3/1981 | Hillman | 371/68 X |

*Primary Examiner*—Jerry Smith
*Assistant Examiner*—Allen MacDonald
*Attorney, Agent, or Firm*—R. P. Lenart

[57] ABSTRACT

An electrical control system monitor includes a microprocessor which conducts a series of control and test functions and outputs a sequence of data words which are representative of the operating status of the system being monitored and the monitor itself. This sequence of data words is fed to a comparator along with a second sequence of data words. Corresponding data words from the two sequences are presented to the comparator during successive partially overlapping time intervals. The comparator produces a given logic level output when its inputs agree and a second given logic level output when its inputs disagree. If the comparator output does not oscillate in a prescribed manner, the output of the monitor is forced into a predetermined output state.

10 Claims, 3 Drawing Figures

DIGITAL CONTROL SYSTEM MONITOR HAVING A PREDETERMINED OUTPUT UNDER FAULT CONDITIONS

BACKGROUND OF THE INVENTION

This invention relates to electrical control system monitors and more particularly to such monitors for use in applications where a failure in the system being monitored or the monitor itself must force the monitor output into a prescribed state.

With the advent of microprocessors, many control systems which were formally implemented with discreet logic are now being designed with microprocessor technology. Certain control system applications are quite critical and failure of the control system may result in the loss of human lives and/or extensive equipment damage. Such systems include railroad control and warning devices, aircraft electrical power control systems, and highway traffic control systems. Classical techniques which have been devised to detect faults within a control unit and cause a safe failure, for example, turning on all of the red lights at a traffic intersection if a unit fails, are not applicable to microprocessor systems. This is due to the complexity of microprocessor large scale integration devices and differences in the technology as compared to discrete circuits.

When a failure in an electrical system has the potential to expose life or property to extreme danger, it is essential that the system be closely controlled. Any failure in the system or the control unit should result in immediate corrective action. Various design techniques are available when designing an electrical system which contains highly reliable control functions. These techniques include back-up logic control circuits, voting schemes, and special data processing techniques.

In aircraft power distribution systems, the failure of a generator must be sensed by the control unit and an auxiliary generator must be switched into the system. In addition, it is desirable to construct a control unit which minimizes weight and size but still has sufficient computational power to perform self test fault detection functions. Once a fault in the control unit or the system being controlled occurs, a clear indication of the failure is required and a positive means for locking the failed device out of the system must be used.

The present invention seeks to provide a highly reliable electrical control system monitor and means for forcing a desired system response when a failure occurs in the monitor or the remainder of the system. A lock and key design approach has been utilized in which a sequence of data words are generated in response to the operational status of the system being monitored and these words are compared with a previously determined sequence of data words. If the generated data words do not have a preselected value, or are not produced in a preselected sequence, the output of the monitor will be forced into a predetermined state. Examples of control systems which utilize a lock and key approach can be found in copending commonly-assigned application Ser. No. 275,425, filed June 18, 1981, now U.S. Pat. No. 4,409,635 issued Nov. 11, 1983, and U.S. Pat. No. 4,107,253, issued Aug. 15, 1978 to Borg et al.

SUMMARY OF THE INVENTION

A control system monitor constructed in accordance with the present invention includes a means for generating a first sequence of data words wherein the data words are representative of the operating status of the system being monitored, means for producing a second sequence of predetermined data words, and a comparator for comparing data words of the first sequence with data words of the second sequence wherein corresponding data words in the first and second sequence of data words are presented to the comparator during successive partially overlapping time intervals. The comparator produces a first logic level output when the data words being compared agree, and a second logic level output when the data words being compared disagree, the monitor further includes means for producing a predetermined output condition when the output of the comparator fails to oscillate between the first and second logic levels in a prescribed manner. In one embodiment of this invention, two capacitors are alternately charged and discharged in response to the logic output level of the comparator. The charging and discharging rates of each of the capacitors are chosen such that the voltage on each capacitor remains above a preselected level when the comparator output oscillates between the first and second logic levels in the prescribed manner. If the voltage on either of the capacitors should fall below the preselected level, the output of the monitor is forced into a predetermined state.

On another level, the present invention encompasses a method of monitoring a control system including the steps of: conducting a series of self-test routines on the system being controlled and the control system monitor; generating a first sequence of data words representing the results of the test routines; presenting each data word of the first sequence to a comparator for a first preselected time interval; presenting a second sequence of predetermined data words to the comparator wherein each data word of the second sequence is presented to the comparator for a second preselected time interval, said first and second time intervals partially overlapping; charging a first capacitor and discharging a second capacitor when the data words presented to the comparator agree; discharging a first capacitor and charging a second capacitor when the data words presented to the comparator disagree; and generating a predetermined output signal when the voltage charge on the first or second capacitor falls below a preselected value.

DESCRIPTION OF THE PREFERRED EMBODIMENTS

Figure 1:
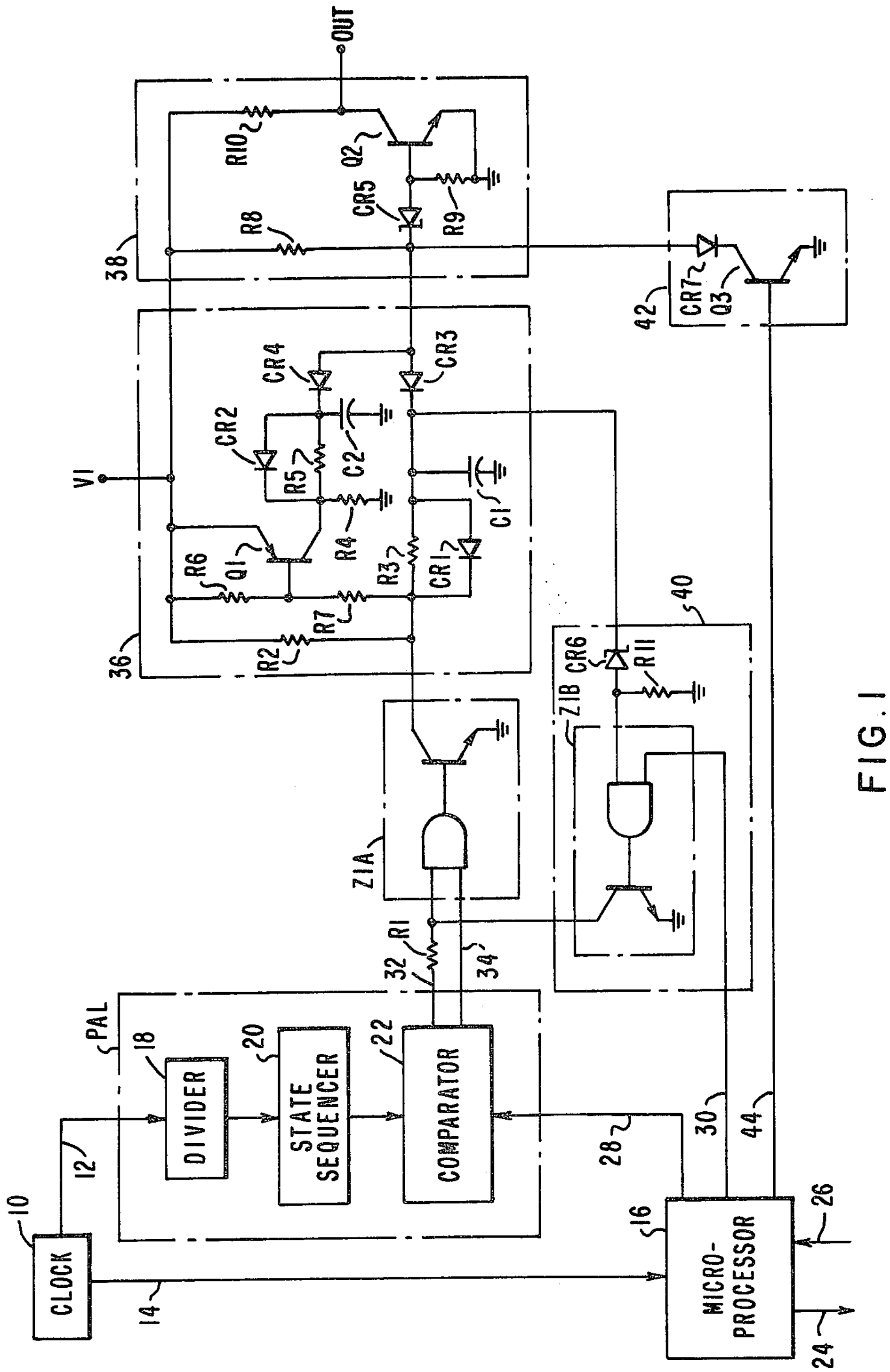
FIG. 1 is a schematic diagram of a control system monitor constructed in accordance with one embodiment of the present invention.

Referring to the drawings, FIG. 1 is a schematic diagram of a control system monitor in accordance with one embodiment of the present invention. In operation, clock 10 produces a time varying signal of a preselected frequency and delivers the signal by way of data lines 12 and 14 to a programmable array logic integrated circuit PAL and a microprocessor 16. The programmable array logic PAL includes a divider 18, a state sequencer 20, and a comparator 22. Divider 18 is used to reduce the clock signal frequency and to control the output of a sequence of predetermined data words produced by state sequencer 20. Microprocessor 16 interacts with the system being monitored by way of data lines 24 and 26. In this manner, it can be programmed to perform various control operations on the system being monitored and also to conduct self-test routines which determine the operational status of the system being monitored as well as the rest of the monitor circuit. In response to the self-test routines, a second sequence of data words is generated which represents the operational status of the system being monitored. These data words are fed in a predetermined sequence to comparator 22 by way of data line 28. The sequence of predetermined data words from state sequencer 20 and the second sequence of data words from microprocessor 16 are presented to comparator 22 during successive time intervals wherein the successive time intervals overlap for a preselected time. When the data words presented to the comparator 22 at any given instant agree, the comparator output goes to a first logic level. When the data words presented to the comparator disagree, the comparator output goes to a second logic level. Since the data words from state sequencer 20 and microprocessor 16 are presented to the comparator in successive partially overlapping time intervals, if microprocessor 16 is repetitively generating a sequence of data words corresponding to the predetermined sequence of data words produced by state sequencer 20, the comparator output will oscillate between a high and low output logic level in a prescribed manner. In this embodiment, comparator output data lines 32 and 34 will receive the same output logic level signal which is fed through resistor R1 and AND switch Z1A to lock circuit 36.

If the logic word sequence being generated by microprocessor 16 corresponds to the logic word sequence produced by state sequencer 20, lock circuit 36 will receive a signal from the collector of the transistor in AND switch Z1A which is varying between a high and low logic level in a prescribed manner. As the Z1A transistor is alternately turned on and off by this signal, capacitors C1 and C2 will alternately charge and discharge. For example, when the output of the AND gate in Z1A is low, the Z1A transistor is off and capacitor C1 charges through resistors R2 and R3 toward voltage level V1. At the same time, transistor Q1 is off and capacitor C2 discharges through resistor R4, resistor R5 and diode CR2. When the output of the AND gate in Z1A is high, the Z1A transistor is on and capacitor C1 discharges through resistor R3, diode CR1 and the Z1A transistor. Simultaneously, resistors R6 and R7 are chosen such that transistor Q1 is turned on and capacitor C2 charges through Q1 and resistor R5 toward voltage level V1. Output circuit 38 acts in response to the voltage level on capacitors C1 and C2 to control an output voltage at output terminal OUT. When the voltage on capacitors C1 and C2 is above a preselected level which is approximately equal to the Zener diode voltage of diode CR5, transistor Q2 will turn on and the output voltage at output terminal OUT will be low. If, for any reason, the voltage on capacitor C1 or C2 falls below the preselected level, diode CR5 will stop conducting and transistor Q2 will turn off raising the output terminal voltage level to approximate voltage level V1.

A latch circuit 40 comprising Zener diode CR6, resistor R11 and AND switch Z1B senses the voltage on capacitor C1 and turns on the transistor of Z1B if the voltage on C1 rises above a preselected level. This pulls one of the input lines on the AND gate in Z1A to a low level and prevents the oscillation of the output of the AND gate in Z1A thereby maintaining the circuit output terminal OUT in a predetermined state. An excessive voltage rise on capacitor C1 would occur in the most common failures.

Transistor Q2 can also be turned off by microprocessor 16 under normal operating conditions by way of interface circuit 42. A logic high output on signal line 44 will turn on transistor Q3, thereby conducting current through CR7 and Q3 to ground. This will lower the voltage across zener diode CR5 to a value less than its threshold voltage. In addition, lock circuit 36 can force transistor Q2 off regardless of the microprocessor output.

Figure 2:
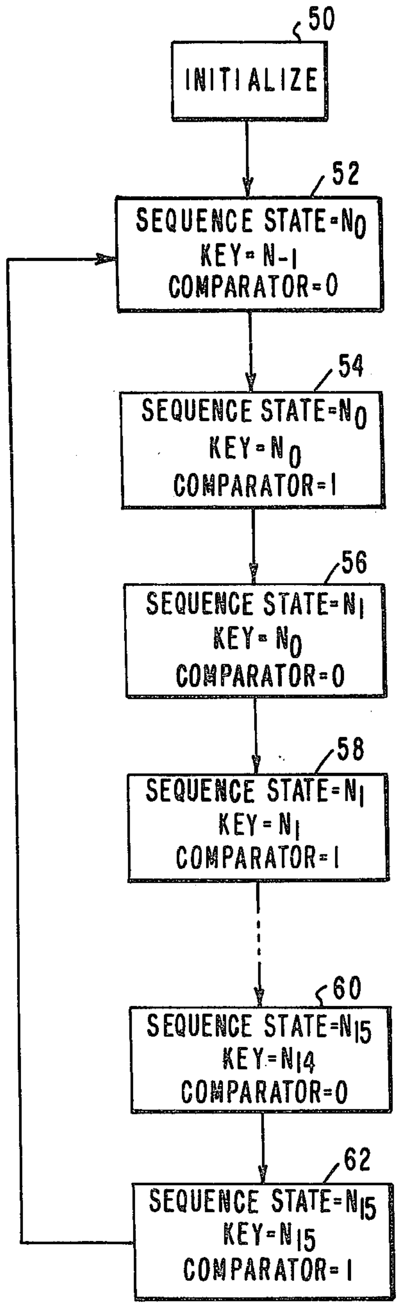
FIG. 2 is a flow diagram illustrating the operation of the circuit of FIG. 1.

FIG. 2 is a flow diagram which illustrates the operation of the circuit of FIG. 1. Block 50 indicates that when the circuit is powered up, the sequence of data words produced by state sequencer 20 and the output data word of microprocessor 16 are initialized such that the state sequencer is addressed to output a data word characterized as sequence state data word $N_0$ and microprocessor output 28 is initialized to output a key data word $N_{-1}$. Block 52 shows that when these data words are fed to comparator 22, the comparator output is a logic zero. In response to a clock signal on data line 14, microprocessor 16 performs a self test routine and outputs a key data word $N_0$ which is representative of the results of the test routine. At the same time, divider 18 has prevented the indexing of state sequencer 20 such that state sequencer 20 is still outputting sequence state data word $N_0$. Therefore, comparator 22 is receiving the same data word $N_0$ on each input and its output goes to a logic one. After a predetermined number of clock pulses are received by divider 18, state sequencer 20 is indexed and outputs sequence state data word $N_1$ as shown in block 56. At this time, microprocessor 16 is still outputting key word $N_0$ and the output of comparator 22 goes to logic zero. Again microprocessor 16 performs a self test routine and generates key word $N_1$ which is output as shown in block 58. When the key word and sequence state data words agree, the comparator output goes back to logic one. This mode of operation continues through blocks 60 and 62 until a preselected number of sequence states have been compared at which point the cycle is repeated. In this example, 16 sequence states are illustrated.

Figure 3:
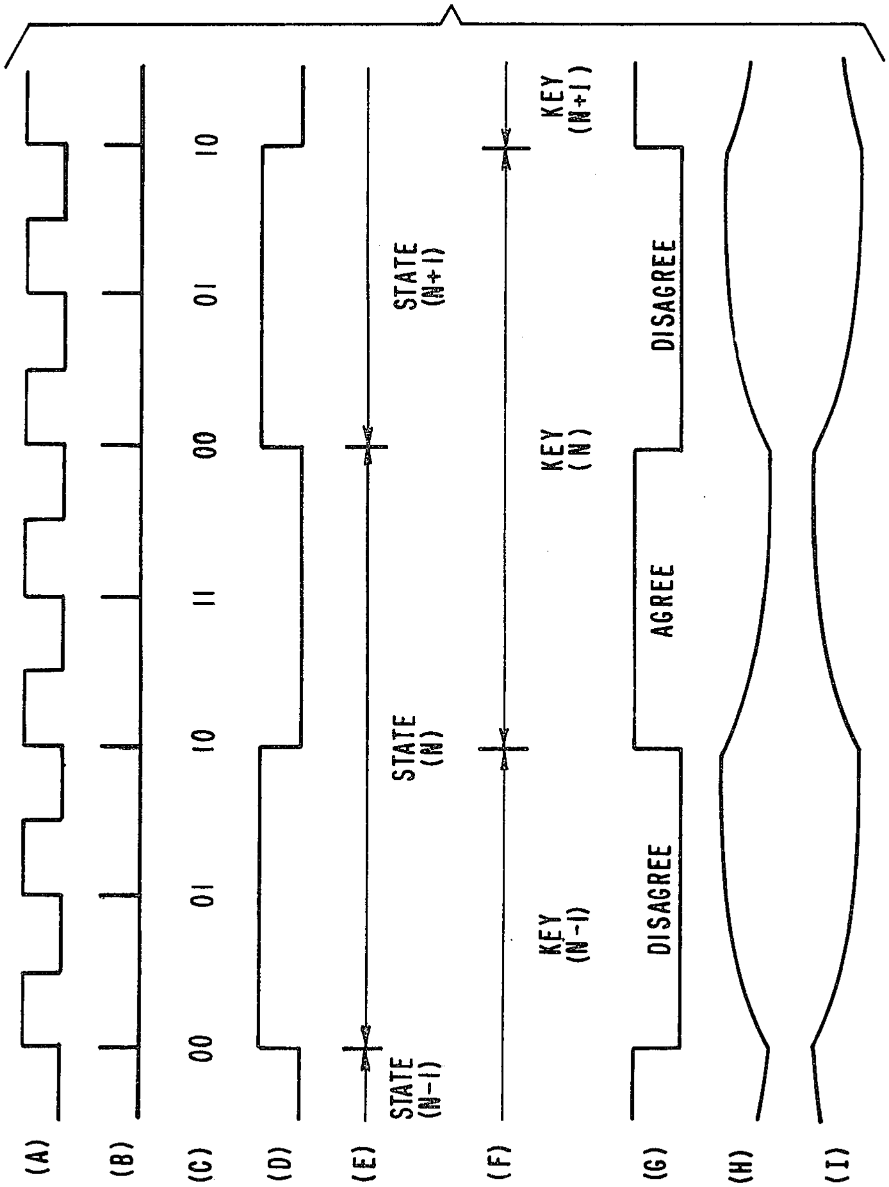
FIG. 3 is a waveform diagram illustrating the operation of the circuit of FIG. 1.

The waveforms of FIG. 3 further illustrate the operation of the circuit of FIG. 1. The output of clock 10 is illustrated by waveform A with the clock pulse rising edges shown in waveform B. Divider 18 includes a counter which assumes the binary states shown on line C of FIG. 3. Waveform D illustrates the output of divider 18. With each rising edge of the divider output, state sequencer 20 changes states as shown on line E of FIG. 3. However, the key data word being generated by microprocessor 16 is not placed on data line 28 until the falling edge of the divider output as shown on line F of FIG. 3. In this manner, the inputs to comparator 22 disagree and agree as illustrated on line G of FIG. 3. In response to the comparator output shown in waveform G, waveforms H and I illustrate the voltage on capacitors C1 and C2, respectively. By controlling the precise timing of presentation of the sequence states from state sequencer 20 and key words from microprocessor 16 to comparator 22, the voltage on capacitor C1 and C2 can be maintained above a certain preselected voltage.

By way of further example, the following Table identifies specific components that may be used in the circuit of FIG. 1 in accordance with one embodiment of the present invention.

TABLE 1

| | |
|---|---|
| PAL | Monolithic Memories PAL16R6MJ |
| MICROPROCESSOR | Intel 8051 |
| Z1 | 75452 |
| Q1 | 2N2907A |
| Q2 | 2N3019 |
| Q3 | 2N2222 |
| C1 | 3.3 μf |
| C2 | 3.3 μf |
| R1 | 200Ω |
| R2 | 2.0 KΩ |
| R3 | 2.2 KΩ |
| R4 | 2.0 KΩ |
| R5 | 2.2 KΩ |
| R6 | 750Ω |
| R7 | 22 KΩ |
| R8 | 15 KΩ |
| R9 | 10 KΩ |
| R10 | 1.5 KΩ |
| R11 | 1.0 KΩ |
| CR1 | 1N4004 |
| CR2 | 1N4004 |
| CR3 | 1N4004 |
| CR4 | 1N4004 |
| CR5 | 6.8 V Zener |
| CR6 | 20 V Zener |
| V1 | 25 Volts |

Utilizing the component values listed in Table 1, a clock having a 400 Hz. square wave output can deliver its output to a divide by four circuit in the programmable array logic comprising two flip-flops. Four other flip-flops in the PAL are arranged as a state sequencer which is clocked by the output of the divide by four circuit. This sequencer circuit will sequence through 16 possible states, always starting with state 0000 upon initial application of circuit power. The 16 states are not in binary order but rather are specifically organized such that at least two of the four binary bits must change between adjacent states. In addition, no two adjacent states are in binary order. An illustration of such a sequence in hexadecimal notation is: 0, D, 4, 1, 8, 2, B, 5, 3, F, 9, C, 6, A, 7 and E. The state sequencer changes to its next state on the rising edge of waveform D of FIG. 3. This corresponds to counter state 00 in divider 18. Until the counter in divider 18 reaches state 10, the preceding key word $N-1$ still appears at the output of microprocessor 16, hence the comparator 22 in PAL will go low since the key word and state disagree. Microprocessor 16 will output its next key word N at counter state 10, causing the comparator to go high. When the counter returns to state 00, the state sequencer will advance to state $N+1$, and the operation will continue as in the preceding step.

While the comparator output is false (low), the output of the AND gate in Z1A will be low, causing C1 to charge and C2 to discharge. While the output of comparator 22 is true (high), the output of the AND gate in Z1A will be high, thereby turning on the transistor in Z1A and causing capacitor C1 to discharge and capacitor C2 to charge. The resistor-capacitor time constants of lock circuit 36 are chosen in this example such that the voltage on capacitors C1 and C2 remains above approximately 9.2 volts if the microprocessor outputs the correct keys at the proper time. If microprocessor 16 fails to output the correct keys at the proper time, the voltage on either capacitor C1 or C2 or both, will fall below approximately 9.2 volts, thereby causing output terminal OUT to go to a high level.

There are four failure areas which can now be discussed in detail: (1) the microprocessor system fails, but the lock is not failed; (2) the lock fails but the microprocessor system is not failed; (3) both the lock and the microprocessor system are failed; and (4) the lock and the microprocessor system are operational, but the output circuit fails. The power of this invention lies in its ability to handle each of these eventualities.

The first scenario, in which the microprocessor system fails, but the lock circuit is operational, is the most probable failure mode due to the comparative complexity of these two subsystems. To keep the monitor output out of its predetermined failure mode, the microprocessor system must correctly output 16 key words at specified times in order to satisfy the lock circuit. Should the microprocessor system fail, there is only a $5.42\times10^{-20}$ probability of correctly guessing the required sequence in the embodiment shown. This probability figure does not take into account the timing requirements of the key words. Hence, even if the microprocessing system should malfunction, it is unlikely that it can open the lock even once. It must be stressed that the ability of the lock and key system to detect a fault in the microprocessor system is directly dependent on the self-testing software. The self-testing routines must exercise every aspect of the system, and must be written such that any fault should cause an incorrect key to be generated and outputted. The microprocessor must not know if the key generated by a test routine is a correct one. This is the sole responsibility of the lock circuit.

The second failure mode considers failure of the lock circuitry alone. Most failures will result in the voltage on capacitor C1 and/or C2 going to about 0 volts. Failures of the divider 18, the state sequencer and the comparator would result in such an action. Note that regardless of the failure states or status of the lock, the microprocessor system has the capability of forcing the monitor output to a predetermined state by generating a low output on signal line 30 or a high output on signal line 44 in FIG. 1.

The third scenario is quite similar to the second. There is a potentially dangerous combination of failures which could occur if transistor Q1 shorts from collector to emitter and switches Z1A and Z1B open circuit. However, this eventuality is rather remote, and provisions can be taken to minimize its probability of occurrence.

The last condition could be detected by the microprocessor system, if the output is sensed and examined by the self test software. Although the microprocessor could not directly address the problem, it could output an indication that manual switching of the output is required. It should be noted that the mean time before failure of the output transistor circuitry is quite long, and hence the associated failure probability rather small.

The lock and key control system monitor which has been described is quite simple, small and inexpensive, but offers considerable fault detection and reliability. The lock circuit should require approximately 2 to 3 square inches of printed circuit board. Although a particular circuit embodiment has been described in detail, it should be apparent to those skilled in the art that various modifications and component substitutions can be made without departing from the scope of this invention. For example, state sequencer 20 could be a read-only memory which is indexed by divider 18 to output the predetermined sequence state data words. In addition, other circuits could be used in place of CR6, R11, Z1B, Q4 and R1.

The present invention is for controlling the operation of a multiple generator power system such as found in aircraft applications. In such a system, the output of a plurality of generators can be reliably monitored and a failed generator can be positively locked out of the system while a reserve generator is switched into the system. Copending commonly assigned application Ser. No. 275,425, filed June 18, 1981, now U.S. Pat. No. 4,409,635, issued Nov. 11, 1983, discloses a power system in which the monitor of FIG. 1 can be inserted, and is hereby incorporated by reference.

The operation of the circuit of FIG. 1 is illustrative of a method of monitoring a control system comprising the steps of: conducting a series of self-test routines on a control system; generating a first sequence of data words representing the results of the test routines; presenting each data word of the first sequence to a comparator for a first preselected time interval; presenting a second sequence of predetermined data words to the comparator wherein each data word of the second sequence is presented to the comparator for a second preselected time interval with the first and second time intervals partially overlapping; charging a first capacitor and discharging a second capacitor when the data words presented to the comparator agree; discharging a first capacitor and charging a second capacitor when the data words presented to the comparator disagree; and generating a predetermined output signal when the voltage charge on the first or second capacitor falls below a preselected value.

What is claimed is:

1. A control system monitor comprising:
   means for generating a first sequence of data words, said data words being representative of the operating status of a system being monitored;
   means for producing a second sequence of data words;
   a comparator for comparing data words of said first sequence of data words with data words of said second sequence of data words wherein corresponding data words in said first and second sequence of data words are presented to said comparator during successive time intervals, said successive time intervals overlapping for a preselected time;
   said comparator producing a first logic level output when said data words being compared agree and a second logic level output when said data words being compared disagree; and
   means for producing a predetermined output condition when the output of said comparator fails to oscillate between said first and second logic levels in a prescribed manner.

2. A control system monitor as recited in claim 1, wherein said means for producing a predetermined output condition comprises:
   two capacitors;
   one of said capacitors being charged while said comparator output is at said first logic level and discharges while said comparator output is at said second logic level;
   the other of said capacitors being discharged while said comparator output is at said first logic level and charged while said comparator output is at said second logic level; and
   the charging and discharging rates of each of said capacitors being chosen such that the voltage on each capacitor remains above a preselected level when said comparator output oscillates between said first and second logic levels in said prescribed manner.

3. A control system monitor as recited in claims 1 or 2, wherein said means for generating said first sequence of data words comprises:
   a microprocessor having a pair of data lines connected to the system being monitored and programmed to conduct tests on the system, the results of said tests being encoded in said first sequence of data words.

4. A control system monitor as recited in claim 3, wherein said data words of said first and second sequences of data words are in binary form, consecutive data words being non-sequential binary numbers.

5. A control system monitor as recited in claim 3, further comprising:
   means responsive to said microprocessor for reducing voltage on one of said capacitors below said preselected capacitor voltage.

6. A control system monitor as recited in claim 5, wherein said means responsive to said microprocessor comprises:
   a transistor switch coupled between said comparator output and ground, said switch being rendered on or off in response to said microprocessor.

7. A control system monitor as recited in claim 2, wherein said charging and discharging rates of said capacitors are controlled by a circuit comprising:
   a first circuit branch connected between a voltage source and ground;
   said first circuit branch including the series connection of a first and second resistor and a first one of said capacitors, with the capacitor being connected to ground;
   a first transistor switch connected between the junction of said first and second resistors and ground, the base of said transistor being coupled to the output of said comparator;
   a second circuit branch connected between said voltage source and ground;
   said second circuit branch including the series connection of a second transistor switch, a third resistor and a second one of said capacitors with said second capacitor being connected to ground;
   a third circuit branch connected between a junction point between said second resistor and said first capacitor and a junction point between said third resistor and said second capacitor;
   said third circuit branch including two series connected diodes wherein the anodes of said diodes are connected together;
   a fourth resistor connected in parallel with said second one of said capacitors; and
   said second transistor switch being off when said first transistor switch is on and said second transistor switch being on when said first transistor switch is off.

8. A control system monitor as recited in claim 2, wherein said means for producting a predetermined output comprises:
   a transistor switch, connected to turn on when the voltage on each of said capacitors is above a preselected level.

9. A control system monitor as recited in claims 1 or 2, further comprising:

a clock for generating a periodic waveform of a preselected frequency;

said waveform being coupled to said means for generating a first sequence of data words and said means for producing a second sequence of data words; and said successive time intervals being overlapping by at least one period of said waveform and being nonoverlapping by at least one period of said waveform.

10. A method of monitoring a control system comprising the steps of:

conducting a series of self-test routines on a control system;

generating a first sequence of data words representing the results of said test routines;

presenting each data word of said first sequence to a comparator for a first preselected time interval;

presenting a second sequence of data words to said comparator wherein each data word of said second sequence is presented to said comparator for a second preselected time interval, said first and second time intervals partially overlapping;

charging a first capacitor and discharging a second capacitor when the data words presented to said comparator agree;

discharging a first capacitor and charging a second capacitor when the data words presented to said comparator disagree; and generating a predetermined output signal when the voltage charge on said first or second capacitor falls below a preselected value.

* * * * *